UNITED STATES PATENT OFFICE.

HENRY K. KISO, OF NEW YORK, N. Y.

COATING COMPOSITION AND PROCESS OF MAKING THE SAME.

1,236,183.   Specification of Letters Patent.   Patented Aug. 7, 1917.

No Drawing.   Application filed February 2, 1917.   Serial No. 146,092.

*To all whom it may concern:*

Be it known that I, HENRY K. KISO, a citizen of the Dominion of Canada, and a resident of the city of New York, borough of Manhattan, in the county and State of New York, have invented a new Coating Composition and Process of Making the Same, of which the following is a full, clear, and exact description.

This invention relates to the production of an insoluble material from the root of certain plants and the process of producing this material. The process consists of treating the natural root of the Conopholis plant known as Konjak, and known in Japan as Kannyaku, whereby a fluid is produced. The root of the plant mentioned is taken in a raw state and chopped and crushed substantially simultaneously by a machine of any kind, said chopping or cutting and crushing operation continuing until the particular supply of roots has become a thick paste, after which it is heated preparatory to applying said paste for causing the preparation to become more liquid.

In applying the prepared material the same may be applied without heating but preferably is applied while hot, as it is in a more liquid state, said application consisting in passing articles through the material or by having the material applied thereto by some instrument, as for instance, a brush. When coated with this material an article becomes waterproof and after the material has dried will become substantially fireproof. The material is also capable of coating wires and acting as an insulation therefor, as well as coating other articles, as for instance, articles of clothing.

In carrying out the process the mere cutting up of the roots would produce a pasty material, but the additional step of cutting the roots up in such manner that the small particles thereof will become crushed during the cutting operation will cause the roots to be converted either to a thick liquid or a pasty material.

In case it is desired to use the material for waterproofing overcoats or for other particular objects, an additional step is utilized in the process, namely, the heating of the cut and crushed material until the liquid parts thereof will rise to the top and form a coating which may be removed from the more solid part left in the container where the material has been heated.

From the above it will be observed that there are three steps in the production of the material for water-proofing by the process described, the first step being the cutting up into a fine state of the roots of the plant Konjak, which when cut up may be used, though not specially desirable for finer articles. The second or next step is the cutting up and crushing of the roots, which may be used in a cold state or heated to less than the boiling point. The third or final step to produce the finest product is in cutting and crushing the roots and then heating the same until the more liquid part of the roots will form an upper layer in the receptacle where they are being heated and the coarser material will form a lower layer, said upper layer being the desirable material while the lower layer is refuse.

In producing the composition other materials may be added thereto for diluting or for making a stiff body if desired, or ordinary rubber may be added in different quantities for different circumstances. If it is desired to make a sheet which will stretch more or less, a comparatively large quantity of rubber is added, but if only water-proofing is desired either no rubber at all or only a small quantity is added. In order to secure any desired color, coloring matter of different kinds may be added in whatever quantity is necessary to produce the shade desired. After the composition of matter has been prepared, either with rubber or without, it may be used in that condition or may be mixed with other things, as for instance, asbestos, cotton or fiber of any kind, either vegetable or animal, or with finely divided pieces of wood. When mixed with these different materials it may be spread or rolled out in sheets and used in this manner. In addition, the composition may be applied to any article directly without mixing; as for instance, it may be applied to paper or cloth, as for instance, netting, and when so applied will cause the article to bend when folded rather than to form a distinct crease, so that it acts as a protective substance when so used. When in a liquid state the composition, whether with or without the rubber, may be bottled or placed in containers and used as a glue or adhesive.

What I claim is:

1. The process of forming a waterproofing material from the root of the plant Konjak, which consists in cutting the roots of said plant until the juices and the body of the root form a pasty substance.

2. The process of forming a waterproofing material from the root of the plant Konjak, which consists in treating the root by cutting the same into small particles and simultaneously crushing the small particles for causing a mixture of the free juices of the root and the pomace of the root.

3. The process of forming waterproofing material from the root of the plant Konjak, which consists in finely dividing the root, crushing the same, then heating the material thus prepared until the juices have accumulated as an upper layer and the pomace as a lower layer, and finally removing the upper layer of juices as a finished product.

4. A manufactured product, consisting of the extracted juices of the root of a plant of the Conopholis family in a cooked state.

5. The process of forming a waterproofing coating from the roots of the plant Conopholis (known as Konjak), which consists in extracting to a limited extent the juices from the roots by cutting and crushing, and then completing the extraction by heating.

HENRY K. KISO.